(12) United States Patent
Murakami et al.

(10) Patent No.: US 6,636,580 B2
(45) Date of Patent: Oct. 21, 2003

(54) CONTROL ROD FOR NUCLEAR REACTOR

(75) Inventors: Kazuo Murakami, Hyogo-ken (JP); Shigemitsu Suzuki, Hyogo-ken (JP); Kyohichi Yoshigai, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 63 days.

(21) Appl. No.: 09/804,091

(22) Filed: Mar. 12, 2001

(65) Prior Publication Data

US 2001/0033632 A1 Oct. 25, 2001

Related U.S. Application Data

(62) Division of application No. 09/266,189, filed on Mar. 10, 1999, now abandoned.

(30) Foreign Application Priority Data

Mar. 26, 1998  (JP) .............................................. 10-79707

(51) Int. Cl.[7] .............................. G21C 7/00; G21C 7/10; G21C 7/117
(52) U.S. Cl. ........................................ 376/333; 376/327
(58) Field of Search .................................. 376/333, 327

(56) References Cited

U.S. PATENT DOCUMENTS 4,172,762 A * 10/1979 Anthony et al. .......... 176/86 R
4,687,621 A * 8/1987 Ferrari ........................ 376/209

FOREIGN PATENT DOCUMENTS

FR    2570214    * 3/1986  ................. 376/327

* cited by examiner

*Primary Examiner*—Michael J. Carone
*Assistant Examiner*—Jack Keith
(74) *Attorney, Agent, or Firm*—Gottlieb, Rackman and Reisman, P.C.

(57) ABSTRACT

A control rod for a nuclear reactor has a structure which is capable of suppressing expansion of a reduced-diameter portion of a neutron absorber in a radial direction under shocks applied upon every stepwise driving of a control rod cluster and which can ensure integrity of a cladding tube over an extended period. The control rod includes a cladding tube closed hermetically at both ends thereof by a top end plug and a bottom end plug, respectively, a neutron absorber loaded into the cladding tube and includes a reduced-diameter portion having a smaller diameter than the other portion, the reduced-diameter portion being disposed at the bottom end plug side of the control rod, and a hold-down spring for pressing the neutron absorber downwardly against the bottom end plug. A sleeve is disposed within an annular space defined between an outer peripheral surface of the reduced-diameter portion and an inner peripheral surface of the cladding tube.

4 Claims, 8 Drawing Sheets

CONTROL ROD FOR NUCLEAR REACTOR

This application is a division of U.S. Ser. No. 09/266,189 filed Mar. 10, 1999 now abandoned which claims foreign priority to the Japanese patent application No. 10-79707 filed Mar. 26, 1998. The contents of these applications are incorporated herein by reference.

BACKGROUND OF THE INVENTION

1. Field of the Invention

The present invention generally relates to a nuclear reactor and, more particularly, to a control rod used in a pressurized water reactor.

2. Related Art

For better understanding of the present invention, background techniques thereof will first be described in some detail. A representative example of a fuel assembly employed in a pressurized water reactor is shown in FIG. 3 of the accompanying drawings. As is shown in the figure and also well known in the art, a fuel assembly 31 includes a plurality of control rod guide tubes 34 fixedly held at both ends by an upper nozzle 32 and a lower nozzle 33, respectively, a plurality of fuel rods 35, and a plurality of supporting lattices 36 through which the control rod guide tubes 34 and the fuel rods 35 are inserted, wherein individual control rods 42 constituting, for example, a control rod cluster 41, as shown typically in FIG. 4, are inserted into the control rod guide tubes 34 from the above or withdrawn therefrom for the purpose of adjusting or regulating the reactor power. As is well known in the art, the number and the disposition of the control rod guide tubes 34 and the fuel rods 35 differ in dependence on the type or species the fuel assembly 31.

Referring to FIG. 5, the control rod cluster 41 is composed of a spider 43 operatively coupled to a driving shaft of a control rod driving unit (not shown) and a plurality of vanes 44 mounted radially on the outer peripheral surface of the spider 43, wherein the control rods 42 are held vertically in the upright state by means of these fingers 45, respectively. Disposition of the fingers 45 and hence that of the control rods 42 corresponds to the disposition of the control rod guide tubes 34 in the fuel assembly 31. As can be seen in FIG. 6, each of the control rods 42 includes a cladding tube 51 formed of stainless steel and hermetically closed at both ends thereof by a top end plug 52 connected to the finger 45 as mentioned above and a bottom end plug 53. Accommodated within the cladding tube 51 is a rod-like neutron absorber 54 which is formed of a neutron absorbing material such as an Ag—In—Cd (silver-indium-cadmium) alloy or boron carbide or the like and which is pressed downwardly against the bottom end plug 53 by a hold-down spring 55 disposed within the cladding tube 51 at a top end portion thereof.

At this juncture, it is to be mentioned that when the control rod 42 of the structure described above is inserted into the control rod guide tube 34 of the fuel assembly 31 loaded in the reactor, the neutron absorber 54 disposed within the control rod cladding tube 51 expands in the axial direction as well as in the radial direction under irradiation of neutrons. Furthermore, there is great likelihood that the soundness or integrity of the cladding tube 51 is impaired due to the irradiation. In the cladding tube 51 itself, the neutron irradiation does increase gradually from the bottom end thereof toward the top end. On the other hand, with regard to the neutron absorber 54, it is noted that a lower end portion 54a thereof among others undergoes noticeable expansion in both the axial and radial directions, as mentioned above. In that case, expansion of the neutron absorber 54 in the axial direction can be absorbed by contraction of the hold-down spring 55. Accordingly, the integrity of the cladding tube 51 can be protected against impairment due to the expansion of the neutron absorber in the axial direction. By contrast, expansion of the neutron absorber 54 in the radial direction can not be absorbed by the hold-down spring 55. For this reason, such arrangement has heretofore been adopted to allow the expansion of the neutron absorber in the radial direction so that the diameter $d_1$ of the lower portion 54a of the neutron absorber 54 is reduced over a length L in the axial direction as compared with a diameter $d_o$ of the other ordinary portion of the neutron absorber.

Now referring to FIGS. 7 and 8, description will be made in detail of a method of determining magnitude of the diameter reduction ($d_0 - d_1$) in the lower portion 54a of the neutron absorber in the radial direction and the axial length L thereof (i.e., length of the reduced-diameter portion in the axial direction). First referring to FIG. 7 which is an exaggerated section of a control rod, clearance between the neutron absorber and the cladding tube is enlarged at the lower portion 54a of the neutron absorber due to the reduction of diameter when compared with the clearance at the upper portion of the neutron absorber. Consequently, the cladding tube 51 is more likely to undergo deformation due to irradiation-induced creep at the location corresponding to the reduced-diameter portion of the neutron absorber, and initially the section form of the cladding tube becomes flattened. Magnitude of such deformation or strain of the cladding tube has to be suppressed enough to fall within a range of elastic deformation in order to ensure insertability of the control rod into the control rod guide tube. In other words, the strain of the control rod guide tube must be held so as not to exceed a strain equivalent to the yield strength or yield capability of the material forming the cladding tube. Further, any decrease in volume of the neutron absorber as a whole due to the reduction of diameter must essentially exert no influence on the neutron absorbing capability. Under the circumstances, the diameter reduction is determined by taking into account the requirements mentioned above.

On the other hand, as the neutron irradiation of the control rod progresses, the neutron absorber expands gradually not only in the axial direction but also in the radial direction to be ultimately brought into contact with the cladding tube, whereby an internal pressure is applied to the cladding tube consequently, the diameter of the cladding tube increases, bringing about strain in the circumferential direction. Thus, the length of the reduced-diameter portion or the lower portion 54a of the neutron absorber is so determined that in the state where the cladding tube has undergone enough neutron irradiation to expand, the strain induced in the circumferential direction in the cladding tube portion which corresponds to the lower end position of the reduced-diameter portion is substantially equivalent to the strain induced in the cladding tube portion corresponding to the upper end position of the reduced-diameter portion (which may be considered as corresponding to the lower end position of the ordinary diameter portion of the neutron absorber). More specifically, since the neutron irradiation dose has a distribution profile such that the dose attenuates along the longitudinal axis of the control rod in the upward direction, the length of the reduced-diameter portion is determined so that difference in the expansion due to difference in the neutron irradiation dose between the lower end portion of the neutron absorber having the ordinary diameter and the diameter-reduced lower end portion of the neutron absorber is equivalent to the diameter reduction. In this conjunction, FIG. 8 illustrates graphically a relation between locations or positions of a cladding tube along the longitudinal axis thereof as viewed from the bottom end of the neutron absorber and strains induced in the cladding tube in the circumferential direction.

As is well known in the art, various types of control rods are available. In a typical conventional control rod, the length L, the diameters $d_0$ and $d_1$ mentioned previously have heretofore been selected, for example, such that $d_0 \approx 8.7$ mm, $d_1 \approx d_0 - 0.13$ mm and that $L \approx 300$ mm.

However, because the control rod cluster 41 constituted by an assembly of the control rods 42 is driven stepwise by the control rod driving unit, shock produced upon stepwise driving of the control rod cluster 41 acts repetitionally on the reduced-diameter portion 54a of the neutron absorber 54 as a compressive load in the axial direction. As a result of this, the diameter of the reduced-diameter portion 54a of the neutron absorber 54 is caused to increase progressively, which in turn promotes the expansion of the reduced-diameter portion 54a of the neutron absorber 54 in the radial direction, whereby the portion of the cladding tube located in the vicinity of the bottom end plug 53 may be abraded due to contact with the control rod guide tube 34 of the fuel assembly 31. Thus, the thickness of the cladding tube at that portion can decrease to such an extent that the control rod 42 within the control rod guide tube 34 may be injured or the control rod 42 jams, giving rise to problems.

SUMMARY OF THE INVENTION

In light of the state of the art described above, it is an object of the present invention to provide a control rod of an improved structure which is capable of suppressing expansion of a reduced-diameter portion of a neutron absorber which is caused to occur in the radial direction under the influence of shock applied upon stepwise driving of a control rod cluster, to thereby ensure integrity of a cladding tube over an extended period.

In view of the above and other objects which will become apparent as the description proceeds, there is provided according to a general aspect of the present invention a control rod for a nuclear reactor, which includes a cladding tube closed hermetically at both ends thereof by means of a top end plug and a bottom end plug, respectively, a rod-like neutron absorber loaded into the cladding tube and having a reduced-diameter portion of a smaller diameter than the other portion of the neutron absorber, the reduced-diameter portion being disposed on the side of the bottom end plug, and a hold-down spring for pressing the neutron absorber downwardly against the bottom end plug. The control rod mentioned above is characterized in that a sleeve is disposed within an annular space defined between an outer peripheral surface of the reduced-diameter portion of the neutron absorber and an inner peripheral surface of the cladding tube. In this conjunction, material and dimensions of the sleeve should preferably be so selected as to ensure a sufficient strength capable of withstanding the expansion of the reduced-diameter portion in the radial direction.

In a preferred mode for carrying out the invention, a lower peripheral edge of the aforementioned other portion of the neutron absorber may be chamfered with an upper peripheral edge of the aforementioned sleeve being chamfered in a shape complementary to the chamfered shape of the lower peripheral edge of the above-mentioned other portion so that the chamfered portion of the sleeve can bear on the chamfered lower peripheral edge of the other portion of the neutron absorber.

In another preferred mode for carrying out the invention, the cladding tube and the sleeve may each be formed of a stainless steel. However, the cladding tube may be formed of a stainless steel, whereas the sleeve may be formed of a material having a smaller thermal expansion coefficient than the stainless steel.

In still another preferred mode for carrying out the invention, the sleeve may be formed in a cylindrical shape having a top closed, wherein the neutron absorber may be physically separated into the reduced-diameter portion and the other portion such that the closed top of the sleeve intervenes between the reduced-diameter portion and the other portion.

In yet another preferred mode for carrying out the invention, the sleeve may have an outer diameter which is substantially equal to the outer diameter of the afore mentioned other portion of the neutron absorber. Further, the bottom end plug may have an axial dimension increased by a predetermined value when compared with an axial dimension of a bottom plug of a conventional control rod having the same axial length as the control rod according to the invention. The predetermined value should preferably be smaller than about 15 mm.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRRED EMBODIMENTS

Figure 1:
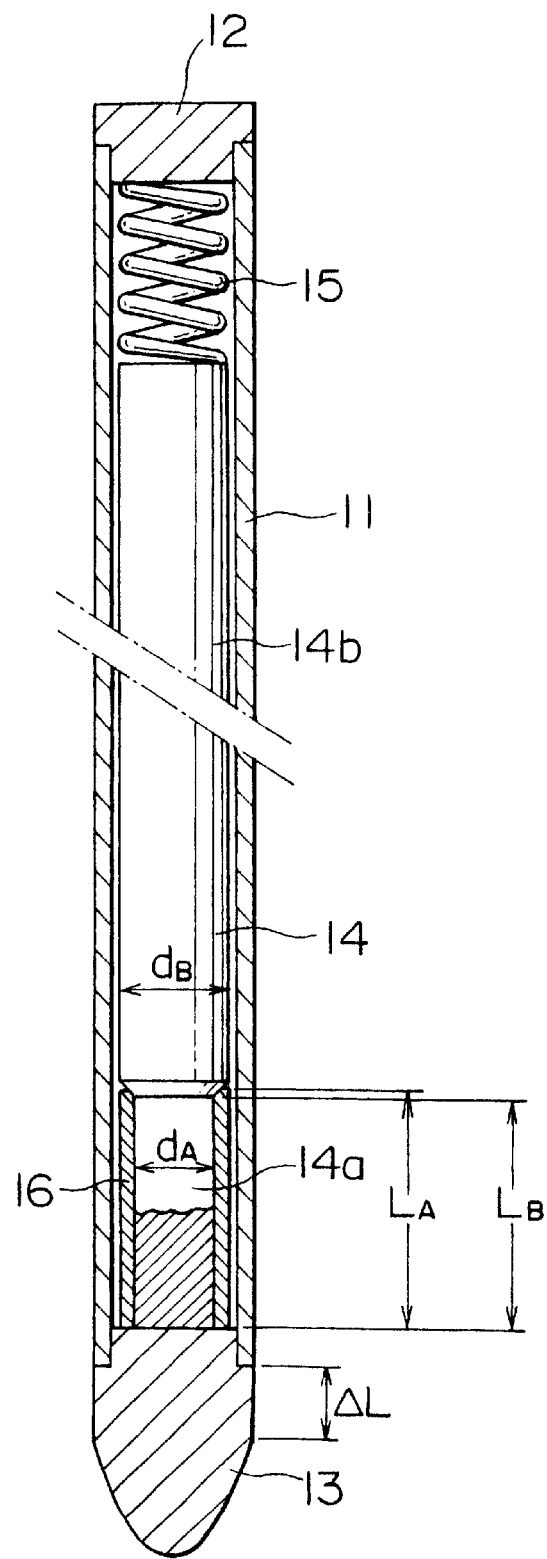
FIG. 1 is a vertical sectional view showing a structure of a control rod according to a first embodiment of the present invention with a portion being broken away as viewed in the longitudinal direction.

The present invention will be described in detail in conjunction with what is presently considered as preferred or typical embodiments thereof by reference to the drawings. In the following description, like reference characters designate like or corresponding parts throughout the several views. Further, as is apparent from the description described below, the present invention is not limited to those embodiments but various modifications and equivalents can be resorted to.

Embodiment 1

Figure 3:
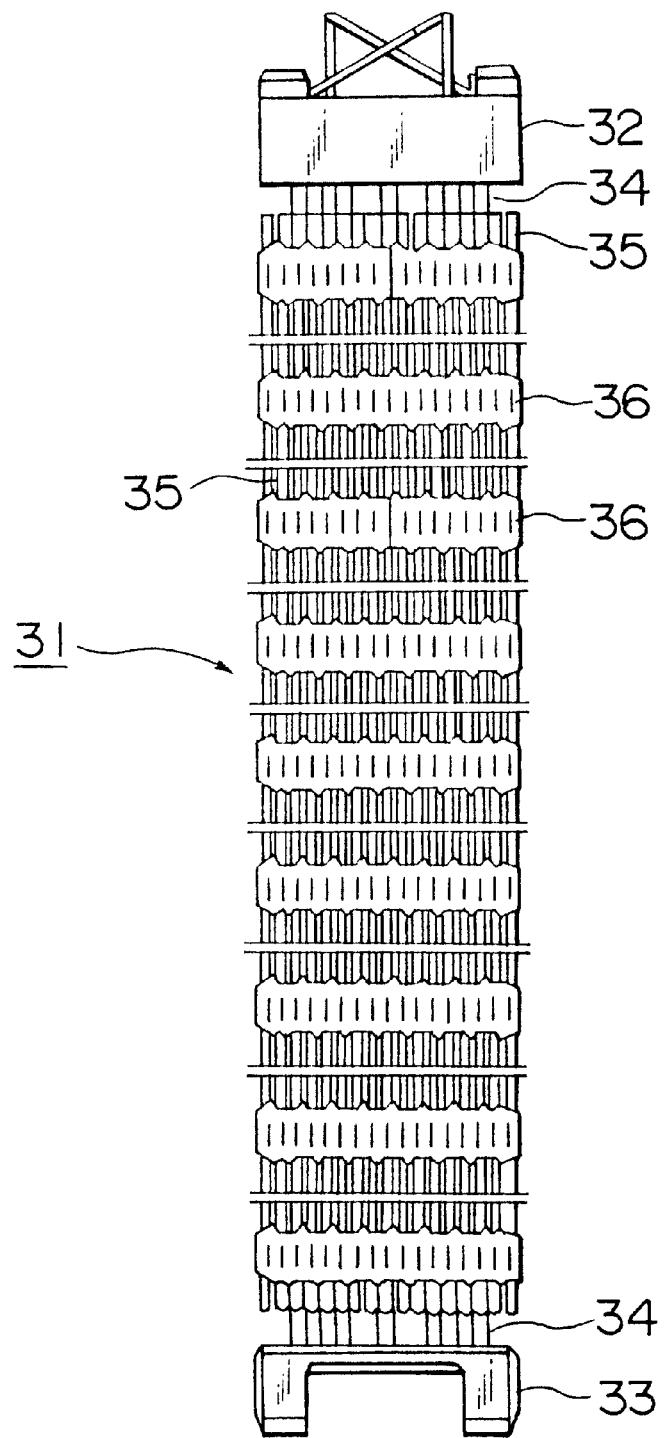
FIG. 3 is a side elevational view of a fuel assembly employed in a pressurized water reactor.
Figure 4:
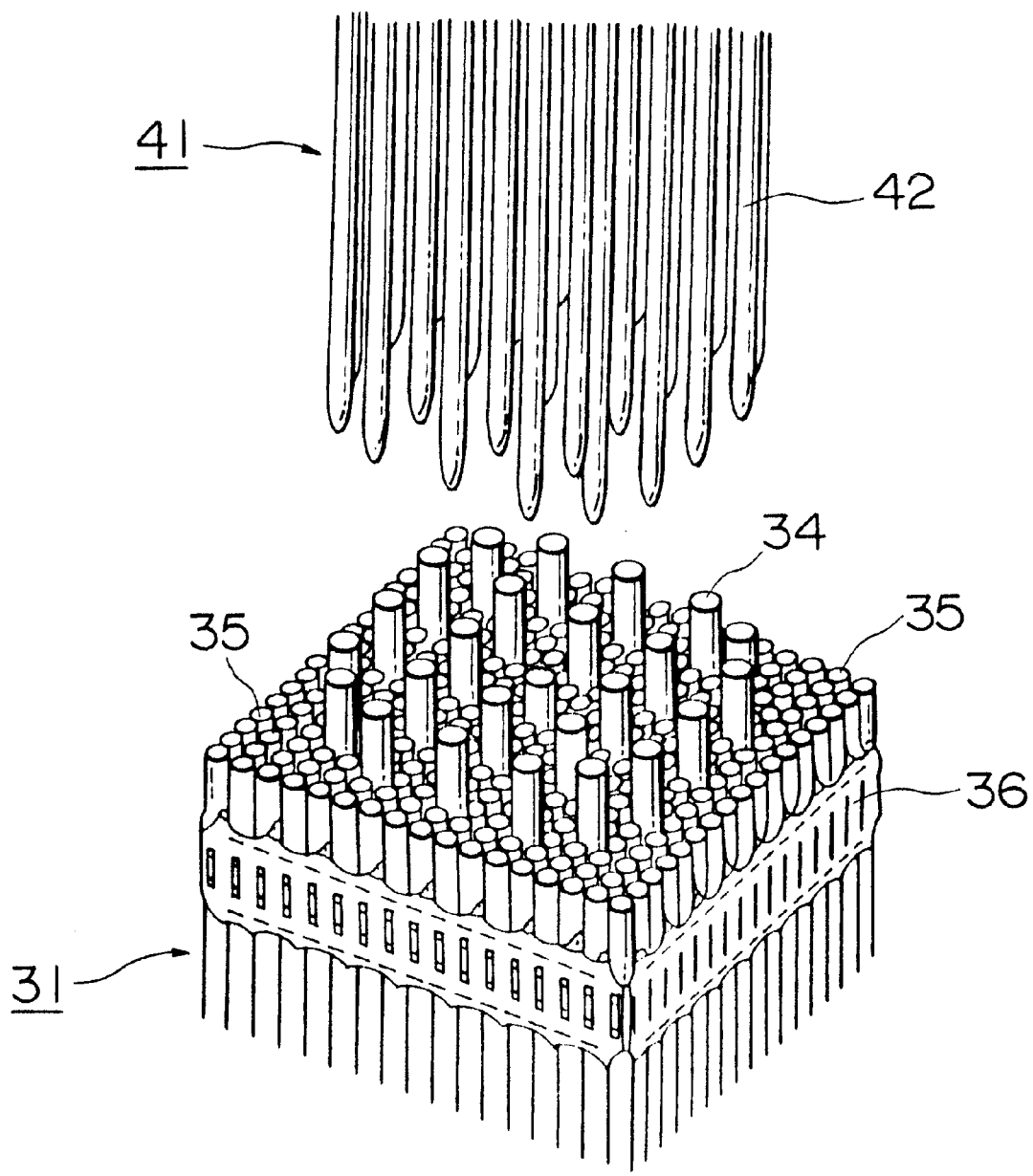
FIG. 4 is a fragmental perspective view showing upper portions of control rod guide tubes and lower portions of control rods of a control rod cluster.
Figure 5:
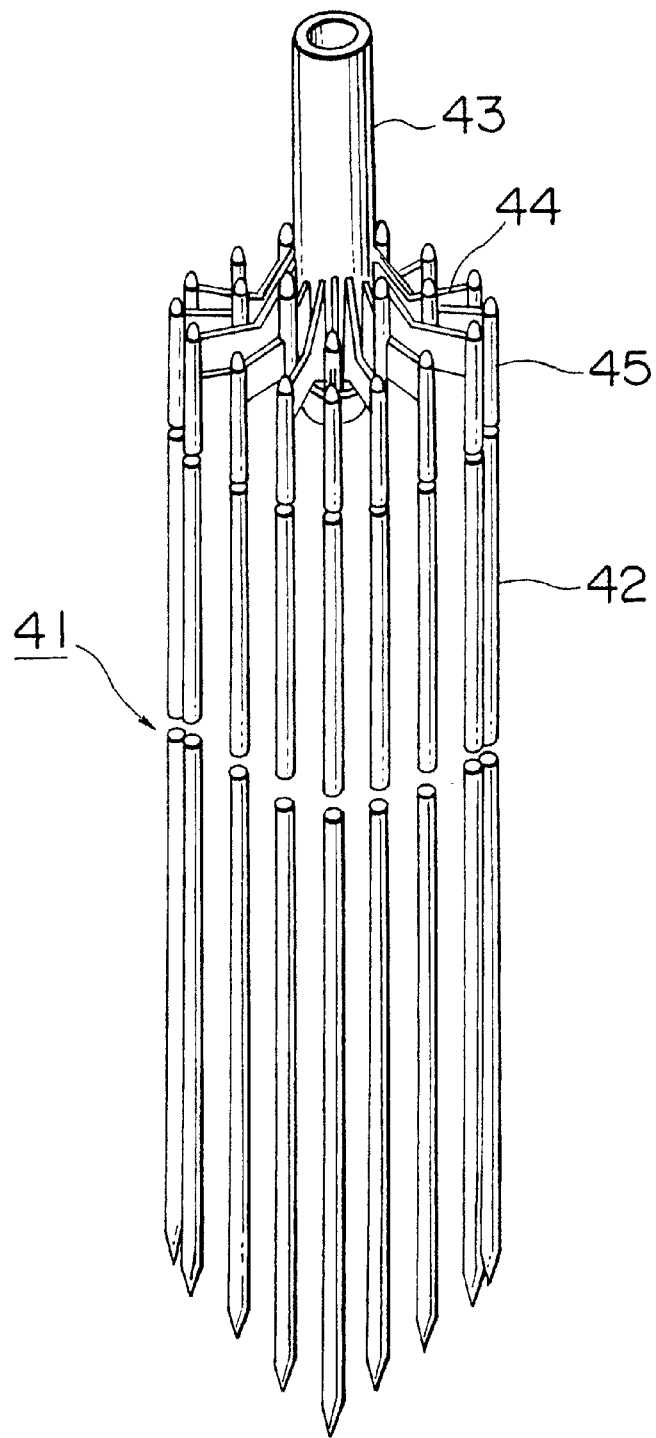
FIG. 5 is a perspective view showing a control rod cluster partially broken away in the longitudinal direction.

FIG. 1 shows a control rod according to a first embodiment of the present invention. At this juncture, it should be mentioned that the structure of the control rod cluster itself which is constituted by the control rods according to the invention as well as that of the fuel assembly into or from which the control rod cluster is inserted/withdrawn may be same as those known heretofore. Accordingly, for the detail of these structures, reference may have to be made to FIGS. 3 to 5 as occasion requires.

Referring to FIG. 1, the control rod according to the first embodiment of the invention includes a cladding tube 11 formed of stainless steel and hermetically closed at both sides thereof by a top end plug 12 and a bottom end plug 13. Accommodated within the cladding tube 11 is a rod-like neutron absorber 14 according to the instant embodiment of the invention. The neutron absorber 14 is formed of a neutron absorbing material such as an Ag—In—Cd (silver-indium-cadmium) alloy or boron carbide or the like and pushed or pressed downwardly onto the bottom plug 13 at a bottom end surface by means of a hold-down spring 15 which is disposed on atop end face within the cladding tube 11.

Further, the neutron absorber 14 includes a reduced-diameter portion 14a located on the side to the bottom end plug and an ordinary diameter portion 14b located above the reduced-diameter portion, wherein a sleeve 16 is disposed within an annular space defined between an outer peripheral surface of the reduced-diameter portion 14a and an inner peripheral surface of the cladding tube 11. The sleeve 16 may be formed of a same material as that of the cladding tube 11 or a material with a thermal expansion coefficient (or rate of thermal expansion) smaller than that of the cladding tube 11 and which has strength that is high enough to withstand a force which may be applied to the sleeve 16 due to expansion of the reduced-diameter portion 14a in the radial direction. Dimensional relations among the sleeve 16, the neutron absorber 14 and the reduced-diameter portion 14a are selectively determined to satisfy the conditions that $L_A > L_B$ and that $d_A < d_B$, where $L_A$ represents the axial length (length in the axial direction) of the sleeve 16, $L_B$ represents the axial length of the reduced-diameter portion 14a, $d_A$ represents the outer diameter of the reduced-diameter portion 14a, and $d_B$ represents the outer diameter of the other ordinary portion 14b of the neutron absorber 14. Parenthetically, the axial length $L_B$ of the reduced-diameter portion 14a may be selected to be equal to the axial length L of the reduced-diameter portion 54a of the conventional neutron absorber heretofore so long as the control rod according to the instant embodiment of the invention is of same type as the conventional one.

As mentioned above, the sleeve 16 may be formed of a same material as that of the cladding tube 11 or a material having a smaller thermal expansion coefficient than the cladding tube 11. In this conjunction, it is preferred to select the material for forming the cladding tube 11 from of austenite type stainless steel (e.g. SUS 304, SUS 316, SUS 347, SUS 348 and so forth which are employed for forming the cladding tube) and anti-corrosion/heat-resistant nickel-based alloys such as Inconel 718 (registered trade name) and the like. Unless the sleeve 16 is formed of the same material as that of the cladding tube 11, material for the sleeve 16 should be so selected that the conditions mentioned below can be satisfied.

1) In respect to the thermal expansion, the sleeve 16 should not be brought into contact with the inner peripheral surface of the cladding tube 11 nor exert internal pressure load to the cladding tube 11 due to excessively large thermal expansion of the sleeve 16 in the high temperature operating state.

2) With regard to the yield strength, the sleeve should have a strength equivalent to or greater than that of the cladding tube 11 so as to be capable of withstanding a load of radial direction (internal pressure) as applied. Additionally, in respect to the load applied in the axial direction, the sleeve should exhibit a buckling strength which can withstand the load applied upon stepwise driving of the control rod cluster.

3) Concerning the thermal conduction, the material for the sleeve should have a thermal conductivity which allows the temperature of a center portion of the neutron absorber to remain lower than the melting point of the neutron absorber even with the temperature rise due to γ-induced heat generation in the reduced-diameter portion 14a of the absorber upon irradiation. Parenthetically, in the case of a low melting point Ag—In—Cd (silver-indium-cadmium) alloy, the temperature of the center portion of the neutron absorber should not exceed ca. 800° C.).

4) Concerning the crack yield strength, the cracking strain of the sleeve after the irradiation should be equivalent to or more than the cladding tube 11.

With the phrase "crack strain", it is intended to mean such a strain at which initiation of fracture can be observed in a cylindrical vessel subjected to an internal pressure. In practice, crack strain is conventionally used on the basis of experimentally obtained knowledges for indicating a strain of magnitude smaller than the fracture strain (elongation) and the uniform strain in conventional tensile tests.

Concerning the dimensions of the sleeve 16, the diameter (thickness) thereof is determined in combination with the selection of the material for satisfying the condition imposed in respect to the strength as mentioned in paragraph 2 above. In this conjunction, the sleeve is so designed as to meet the conditions mentioned below.

1) In respect to the temperature at a center portion of the neutron absorber 14, the sleeve is so designed that this temperature can remain lower than the melting point of the absorber through thermal conduction even with the heat generation in the reduced-diameter portion 14a, the sleeve 16 and the cladding tube 11 due to the γ-radiation. By way of example, in the case of the Ag—In—Cd alloy which has a relatively low melting point, the temperature at the center portion of the absorber must not exceed ca. 8OO'C.

Figure 6:
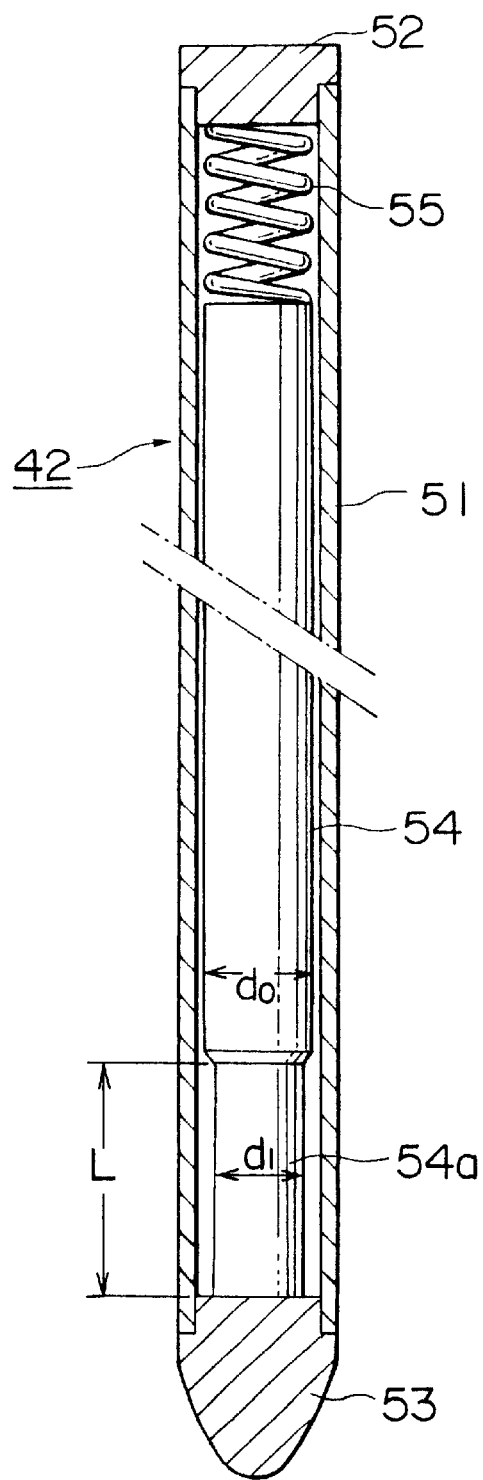
FIG. 6 is a vertical sectional view showing a structure of a conventional control rod known heretofore with a portion being broken away.
Figure 7:
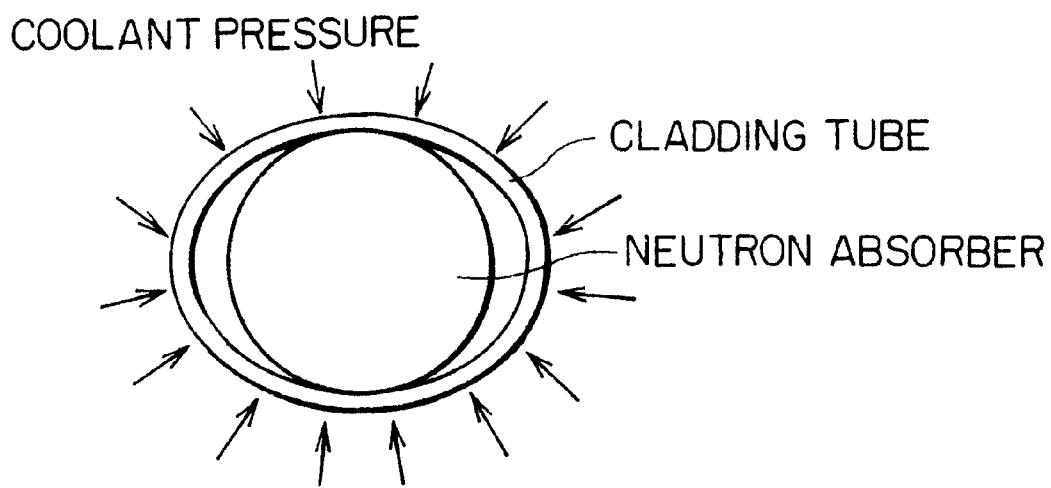
FIG. 7 is a view for illustrating schematically changes in cross-section of a control rod when a cladding tube thereof has undergone creep deformations under irradiation of neutrons.
Figure 8:
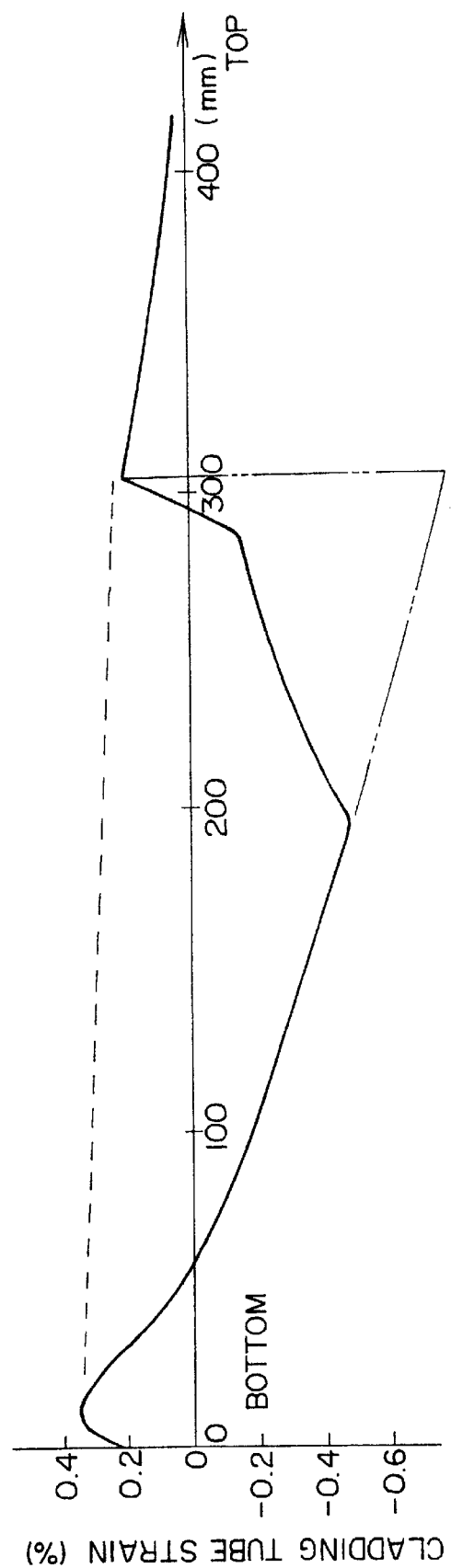
FIG. 8 is a graph illustrating a relation between locations of a cladding tube along thereof as viewed from a bottom end and strain induced in a cladding tube direction, the longitudinal axis of a neutron absorber in the circumferential

2) In view of realization of an extended service life of the cladding tube in the wholesome state, the time taken for the internal pressure applied to the cladding tube 11 to make appearance after the start of the irradiation is at least longer than the corresponding time in the conventional control rods. More specifically, so long as the sum of clearance between the outer diameter of the reduced-diameter portion 14a and the inner diameter of the sleeve 16 and clearance between the outer diameter of the sleeve 16 and the inner diameter of the cladding tube 11 is same as the clearance between the outer diameter of the reduced-diameter portion 54a and the inner diameter of the cladding tube 51 in the conventional cladding tube shown in FIG. 6, it is expected that the service life of the control rod can be extended for a time period which corresponds to the time taken for the reduced-diameter portion 54a to expand in the axial direction under the irradiation. Thus, in the control rod according to the instant embodiment of the invention, the outer diameter $d_A$ of the reduced-diameter portion 14a of the neutron absorber is further reduced when compared with the diameter $d_1$ of the reduced-diameter portion 54a of the neutron absorber 54 in the conventional control rod on the condition that the neutron absorbing capability can be sustained within a tolerance range, while the thickness of the sleeve 16 is increased by an amount corresponding to the difference between the diameters $d_A$ and ($d_1$ mentioned above (i.e., $d_1-d_A$).

3) The clearance between the outer diameter of the reduced-diameter portion 14a and the inner diameter of the sleeve 16 as well as the clearance between the outer diameter of the sleeve 16 and the inner diameter of the cladding tube 11 can be set to appropriate values, respectively, which may be determined by taking into consideration the assemblability and manufacturability of the control rod. In that case, these clearances should be so determined that smooth insertion can be ensured without incurring interference even when tolerances imposed on the above-mentioned outer diameters and inner diameters in combination are most severe. In practical applications, the clearances may be set to values obtained by adding ca. 0.05 mm to the differences between the aforementioned outer diameters and the inner diameters, respectively, for the most severe tolerances while taking into account bend of the sleeve 16.

Accordingly, when the control rod according to the present invention and a conventional one are of the same size, at least the condition that $d_B=d_0$ (see FIGS. 1 and 6) holds true. However, because the diameter of the reduced-diameter portion 14a of the neutron absorber in the control rod according to the invention is further reduced down to the limit at which the neutron absorbing capability can be sustained, the relation between the diameter $d_A$ of the reduced-diameter portion 14a of the neutron absorber in the control rod according to the invention and the corresponding diameter $d_1$ of the reduced-diameter portion in the conventional control rod can naturally be represented by $d_A<d_1$ (see FIGS. 1 and 6). Thus, the diameter reduction of the neutron absorber in the control rod according to the invention should preferably exceed the diameter reduction of the neutron absorber in the conventional control rod by a value falling within a range of about 0 to 0.7 mm. Furthermore, the axial length $L_A$ of the sleeve 16 should preferably be so selected as to be substantially equal to the axial height of the reduced-diameter portion 54a of the conventional control rod, while the axial length $L_B$ of the reduced-diameter portion 14a of the neutron absorber may be selected to a value obtained by subtracting height of a tapered portion (ca. 20 mm) from the axial length $L_A$ of the sleeve 16.

Further, in the control rod according to the instant embodiment of the invention, the axial length of the bottom end plug 13 is lengthened by $\Delta L$ when compared with that of the conventional control rod having the same overall length as the control rod according to the instant embodiment of the invention. However, because the axial length of the top end plug is shortened by $\Delta L$ in the control rod according to the instant embodiment of the invention, the axial lengths of the cladding tube 11 and the neutron absorber 14, respectively, of the control rod according to the invention are substantially the same as those of the conventional control rod. When the axial length of the bottom end plug is increased by $\Delta L$, as described above, the relative positional relation between the neutron absorber and the fuel will naturally deviate in the state where the control rod is fully inserted into the guide tube of the fuel assembly, as a result of which in the region where neutrons are emitted from the fuel, the region where the neutrons cannot be covered by the neutron absorber (a region in the vicinity of the bottom end of the fuel rod) will increase. In this conjunction, increase of the region incapable of neutrons up to ca. 15 mm at maximum is considered to be permissible from the nuclear standpoint. Accordingly, the upper limit of the increase $\Delta L$ in the axial length of the bottom end plug 13 should be ca. 15 mm.

As is apparent from the foregoing, in the control rod according to the first embodiment of the invention, the sleeve 16 disposed within the annular space defined between the outer peripheral surface of the reduced-diameter portion 14a and the inner peripheral surface of the cladding tube 11 has a sufficient strength against the expansion of the reduced-diameter portion 14a in the radial direction. Thus, the tendency of the reduced-diameter portion 14a to expand in the radial direction can be suppressed by the sleeve 16. In this way, not only the expansion of the neutron absorber 14 in the radial direction under irradiation with neutrons but also radial expansion thereof due to shock applied upon stepwise driving of the control rod cluster can be effectively suppressed, whereby the integrity of the cladding tube 11 can be maintained over an extended period.

Furthermore, because the sleeve 16 is formed of the same material as the cladding tube 11 or a metal material having a lower thermal expansion coefficient than the cladding tube 11, the integrity of the cladding tube 11 can be protected against damage due to thermal expansion of the sleeve 16.

In addition, because the lower peripheral edge of the ordinary diameter portion 14b, exclusive of the reduced-diameter portion 14a of the neutron absorber 14, is chamfered with the top end portion of the sleeve 16 being also chamfered complementarily, the axial length $L_A$ of the sleeve 16 is slightly increased beyond the axial length $L_B$ of the reduced-diameter portion 14a, so the ordinary diameter portion 14b of the neutron absorber 14 above the reduced-diameter portion 14a thereof can be placed in a state supported from the underside. Thus, it is difficult for the shock applied upon stepwise driving of the control rod cluster to be transmitted to the reduced-diameter portion 14a, whereby the tendency of the reduced-diameter portion 14a to expand radially can be more positively suppressed.

Besides, by increasing the length of the bottom end plug 13 by $\Delta L$, possible interference of the control rod with the control rod guide tube 34 is limited to the bottom end plug 13 of the control rod. Thus, the cladding tube 11 can be protected against abrasion due to such interference.

Embodiment 2

Figure 2:
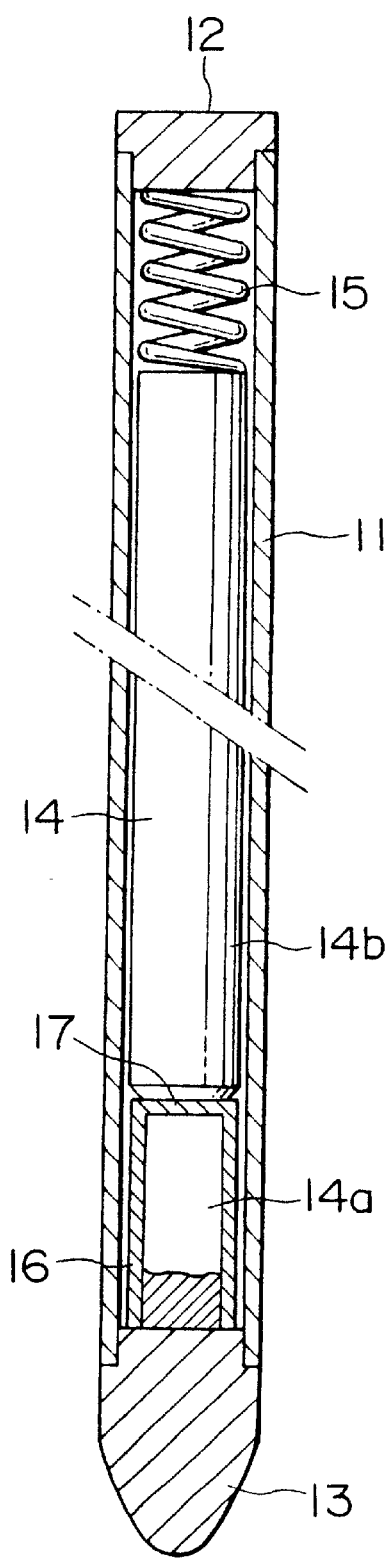
FIG. 2 is a vertical sectional view showing a structure of a control rod according to a second embodiment of the present invention with a portion being broken away in the longitudinal direction, similar to FIG. 1.

The control rod according to a second embodiment of the present invention will be described by reference to FIG. 2. As can be seen in the figure, the control rods according to the second embodiment are implemented in such a structure that a cladding tube 11 formed of a stainless steel is hermetically closed at both ends by a top plug 12 and a bottom plug 13, respectively, wherein a rod-like neutron absorber is accommodated within the cladding tube 11. The neutron absorber 14 is formed of a neutron absorbing material such as an Ag—In—Cd (silver-indium-cadmium) alloy or boron carbide or the like and pressed downwardly against a bottom plug 13 by means of a hold-down spring 15 disposed within the cladding tube 11 at a top end portion thereof.

Further, the neutron absorber 14 includes a reduced-diameter portion 14a which is located at the side of the bottom end plug and which has a smaller diameter than the other portion of the neutron absorber 14 having an ordinary diameter, wherein a sleeve 16 is disposed within an annular space defined between the outer peripheral surface of the reduced-diameter portion 14a and the inner peripheral surface of the cladding tube 11. The sleeve 16 is formed of the same material as that of the cladding tube 11 or a material of a smaller thermal expansion coefficient (or rate of thermal expansion) than the cladding tube 11 and has a sufficient strength for withstanding expansion of the reduced-diameter portion 14a in the radial direction. Further, the sleeve 16 has a cover head 17 at a top end thereof, and the neutron absorber 14 is divided into the reduced diameter portion 14a and the other portion 14b of the ordinary diameter by the cover head 17.

In the control rod according to the second embodiment of the invention, the sleeve 16 disposed within the annular space defined between the outer peripheral surface of the reduced-diameter portion 14a of the neutron absorber 14 and the inner peripheral surface of the cladding tube 11 has sufficient strength to withstand the expansion of the reduced-diameter portion 14a of the neutron absorber 14 in the radial direction. Thus, there can be obtained advantageous effects similar to those of the control rod according to the first embodiment of the invention described hereinbefore.

Besides, owing to the structure in which the neutron absorber 14 is separated into the reduced-diameter portion 14a and the portion 14b of the ordinary diameter by the cover head 17 of the sleeve 16, it is difficult for shock generated when the control rod cluster is driven stepwisely to be transmitted to the reduced-diameter portion 14a of the neutron absorber 14. As a result, expansion of the reduced-diameter portion 14a of the neutron absorber 14 in the radial direction can be suppressed more positively.

As will now be understood from the foregoing description, according to the teachings of the present invention, expansion of the reduced-diameter portion of the neutron absorber in the radial direction can be suppressed notwithstanding the shocks applied during each stepwise driving of the control rod cluster, whereby the integrity of the cladding tube can be sustained over a remarkably extended period.

Many modifications and variations of the present invention are possible in light of the above techniques. It is therefore to be understood that the invention may be practiced otherwise than as specifically described, within the scope of the appended claims.

What is claimed is:

1. A control rod for a nuclear reactor, comprising:
   a cladding tube closed hermetically at both ends thereof by means of a top and a bottom end plugs, respectively;
   a neutron absorber loaded into said cladding tube and including a reduced-diameter portion having a smaller diameter than the other portion, said reduced-diameter portion being disposed at the bottom end plug side of said control rod, said other portion of said neutron absorber having a lower peripheral edge, said edge having an inwardly facing chamfer;
   a hold-down spring for pressing said neutron absorber downwardly against said bottom end plug;
   a sleeve being disposed within an annular space defined between an outer peripheral surface of said reduced-diameter portion of said neutron absorber and an inner peripheral surface of said cladding tube, said sleeve having an upper peripheral edge, said edge being chamfered on its inner side; and
   said chamfered edges of said sleeve and said other portion of said neutron absorber being complementary to each other, said chamfered edge of said sleeve being positioned on said chamfered edge of said other portion of said neutron absorber.

2. A control rod according to claim 1, wherein said chamfered portion of said sleeve has an axial length not greater than ca. 20 mm.

3. A control rod according to claim 2, wherein said reduced-diameter portion has a diameter which is substantially equal to a value obtained by subtracting from the diameter of said other portion of said neutron absorber the sum of 0.13 mm and not more than about 0.7 mm.

4. A control rod according to claim 3, wherein said sleeve has an outer diameter which is substantially equal to the outer diameter of said other portion of said neutron absorber.

* * * * *